UNITED STATES PATENT OFFICE.

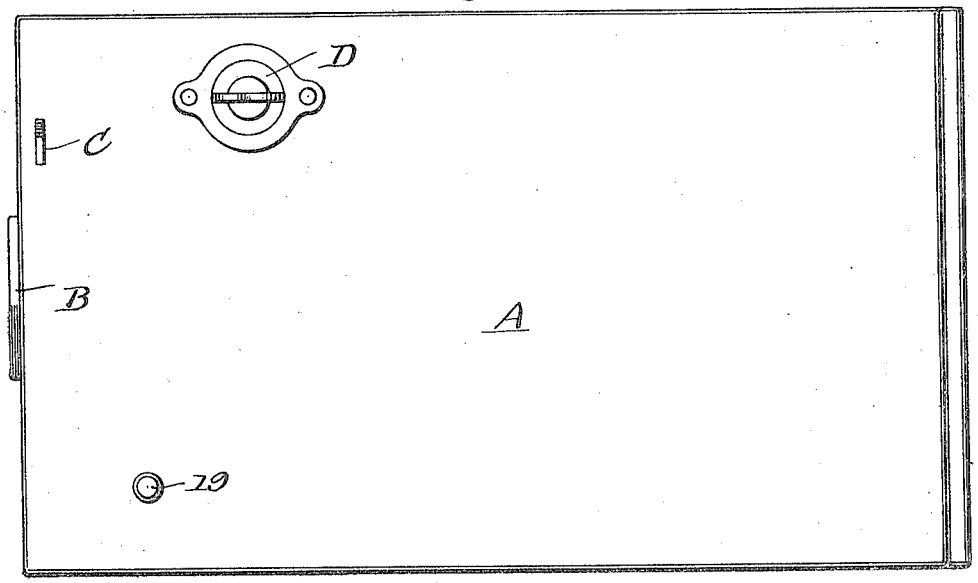
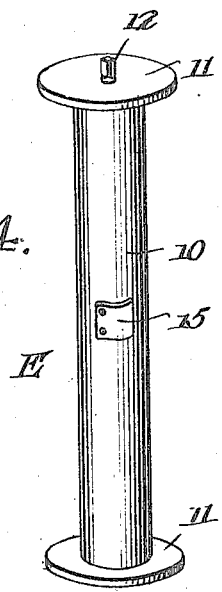
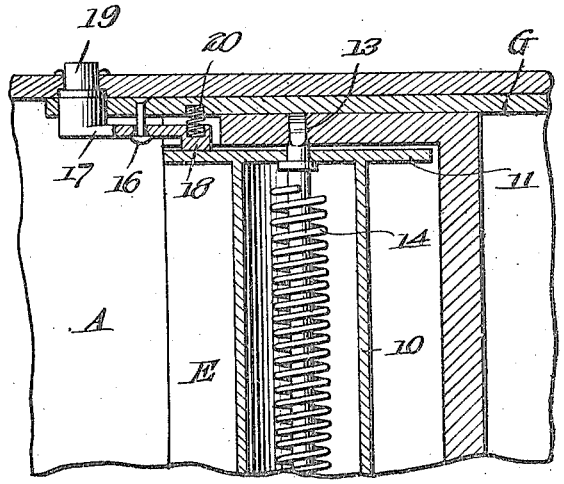

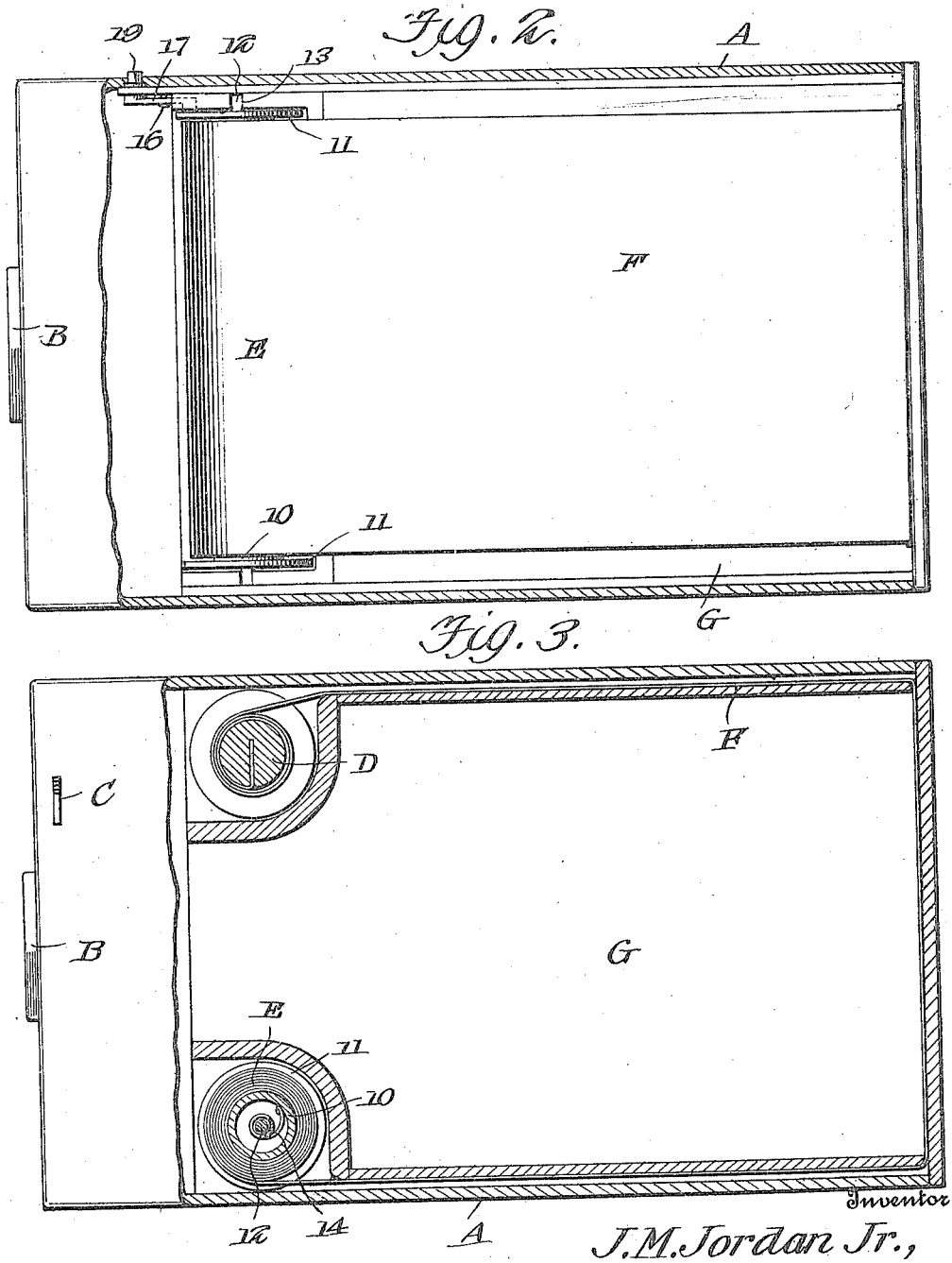

JOSEPH M. JORDAN, JR., OF ATLANTIC CITY, NEW JERSEY.

CAMERA ATTACHMENT.

1,257,874. Specification of Letters Patent. Patented Feb. 26, 1918.

Application filed October 17, 1916. Serial No. 126,151.

*To all whom it may concern:*

Be it known that I, JOSEPH M. JORDAN, Jr., a citizen of the United States, residing at Atlantic City, in the county of Atlantic and State of New Jersey, have invented new and useful Improvements in Camera Attachments, of which the following is a specification.

The invention relates to cameras, and more particularly to the class of automatic film winding attachments for cameras or the like.

The primary object of the invention is the provision of a winding attachment of this character wherein the film will be automatically wound within the camera after exposures have been made, the winding of the film when exposures are made being effected by hand as usual.

Another object of the invention is the provision of an attachment of this character wherein the construction thereof is novel in form so that the film will be automatically wound and is held under the control of the operator and thus in this manner expediting the handling of the film after exposures thereof have been made in the usual manner.

A further object of the invention is the provision of an attachment of this character wherein the film can be readily introduced in the camera and removed therefrom after making exposures thereof.

A still further object of the invention is the provision of an attachment of this character which is simple in construction, thoroughly reliable and efficient in its operation, and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings;

Figure 1 is a top plan view of the camera with the attachment constructed in accordance with the invention;

Fig. 2 is a side elevation showing a major portion of the camera body broken away;

Fig. 3 is a top plan view showing a major portion of the body broken away, with the attachment in section;

Fig. 4 is a perspective view of the automatic winding spool;

Fig. 5 is a fragmentary vertical longitudinal sectional view.

Similar reference characters indicate corresponding parts throughout the several views of the drawings.

Referring to the drawings in detail, A designates generally the body of the camera which, at the front, carries the usual lens B, while C is the shutter operating lever which protrudes exteriorly of the body at the top thereof and is actuated in the ordinary well known manner for the exposure of the film interiorly of the camera in the taking of pictures.

Arranged within the body of the camera at the right hand side thereof is a hand operated film winding spool D on which is adapted to be wound the film F, and this spool is turned by means of a suitable hand hold or key, as usual, while at the left hand side of said camera body interiorly thereof is an automatic film winding device E.

The film winding device comprises a spool which is in the form of a cylindrical or tubular barrel 10 having the end disks or heads 11, and passed centrally through these disks or heads is a shaft or journal 12 which rotatably supports the winding spool, the ends of the shaft or journal 12 being designed for detachable engagement in suitable grooves or seats 13 formed in opposite walls of a film carrier G which is insertible within the rear end of the body A of the camera and is of the ordinary well known construction. It is of course understood that the barrel 10 is loose upon the shaft or journal 12 for free rotation thereon and has interiorly thereon a coiled winding and unwinding spring 14 which surrounds the shaft or journal 12 and has one end fixed thereto, while its opposite end is fixed to the interior wall of the barrel 10, the spring being normally unwound when the spool is placed within the camera A and carrying the unexposed film with its protective covering constructed as usual. On the placing of the spool E within the film carrier the film is drawn from the spool and trained about the carrier as shown in Fig. 3 of the drawings, and the free end of said film engaged with the spool D, which latter is adapted to be operated by hand for the winding of the film thereon when making successive exposures, as usual. The winding of the film upon the spool D causes the spring to become tensioned so that after the film has been fully and completely exposed it will be automatically wound upon the spool of the winding device E, as hereinafter fully described.

It is to be understood, of course, that the shaft or journal 12 for the barrel 10 when engaged in the seat or groove 13 is held fixed against rotation, but the barrel 10 is free to rotate thereon under the resistance of the spring therein.

When the film is purchased it is upon the device E and is normally wound thereon and upon placing it in the camera the free end of the protective covering for the film or the film itself is detachably fastened to the spool D and on exposing the film when the shutter is operated in the usual manner the spool D is rotated for the winding of the film thereon until it has been completely exposed in the taking of pictures. The film is detachably connected to the spool E through the medium of suitable clips or fasteners 15, although it may be otherwise fastened thereto if desired.

Mounted within the carrier for the film is a latch lever 17 which is formed with a latch end 18 adapted to engage the head or disk 11 adjacent thereto of the spool E so as to lock the spool against free rotation, the opposite end of the lever 17 being adapted to be engaged by means of a push button 19 which is suitably mounted within the top of the body A and is accessible interiorly thereof for manual manipulation so that on depressing the button it will rock the lever 17 to free the latch end 18 from the spool E so that the winding device will automatically operate for the rewinding of the film thereon after exposures have been made.

Mounted within the carrier and adapted to act upon the latch lever 17 is a spring 20 so as to hold the said lever in a position for normal locking engagement with the spool E, thereby frictionally holding the same against rotation until released, whereupon the spring 14 which has become tensioned on the unwinding of the film from said spool E will become active interiorly of the barrel 10 for the automatic rewinding of the film upon said spool E, thereby obviating the necessity of hand rewinding of said film.

Of course it is to be understood that the invention is not restricted to the particular mounting of the spool E or any of its adjunct parts as the same may be mounted in any suitable manner, the salient feature of the invention being the spring incased within the barrel 10 and acting thereupon for the automatic rewinding of the film upon the spool E without necessitating the hand winding thereof after said film has been fully or partially exposed as the occasion may require, this spool E being under the control of the operator so as to regulate the extent of the winding of the film after it has been wound upon the spool D by hand when making exposures for the taking of pictures. It is obvious that by exerting a proper pressure on the button 19 that the speed of rotation of the spool E may be controlled, thereby, governing the speed at which the film is wound thereon.

From the foregoing description, taken in connection with the accompanying drawings, the construction and operation of the herein described camera attachment will be readily apparent and, therefore, a more extended explanation has been omitted.

Having thus described my invention, I claim:

1. The combination with a camera including a pair of winding and unwinding spools, one of which is capable of automatic rotation and provided with disk like ends, of a brake normally holding the automatically rotatable spool against movement, said brake comprising a lever pivoted intermediate its ends to the camera casing, one end of said lever carrying a laterally extending offset engaging member, the face of which is positioned to normally engage the flat face of one of the disk like ends of the automatically rotatable spool, a laterally extending operating button located at the opposite end of said lever and extending in an opposite direction to the spool engaging member through an opening in the camera casing and a spring interposed between the laterally pivoted engaging member and the casing.

2. In a camera, a pair of winding and unwinding spools journaled interiorly thereof and removable therefrom and adapted to receive a film, means for effecting automatic rotation of one of said spools, means for setting the automatic rotating means, a lever pivoted intermediate its ends within the camera, a laterally extending spool engaging head formed on one end of said lever, a laterally and oppositely extending finger piece carried by the opposite end thereof and extending through an opening provided in the camera casing and a spring seated in sockets formed in said head and casing to normally urge the lever into engagement with the spool.

In testimony whereof I affix my signature.

JOSEPH M. JORDAN, Jr.

Copies of this patent may be obtained for five cents each, by addressing the "Commissioner of Patents, Washington, D. C."